(12) United States Patent
Delli Paoli et al.

(10) Patent No.: US 12,071,230 B2
(45) Date of Patent: Aug. 27, 2024

(54) ANTI-TORQUE ROTOR FOR A HELICOPTER

(71) Applicant: LEONARDO S.P.A., Rome (IT)

(72) Inventors: Michele Delli Paoli, Samarate (IT); Fabio Nannoni, Samarate (IT); Roberto Vanni, Samarate (IT)

(73) Assignee: LEONARDO S.P.A., Rome (IT)

( * ) Notice: Subject to any disclaimer, the term of this patent is extended or adjusted under 35 U.S.C. 154(b) by 532 days.

(21) Appl. No.: 17/424,294

(22) PCT Filed: May 26, 2020

(86) PCT No.: PCT/IB2020/054976
§ 371 (c)(1),
(2) Date: Jul. 20, 2021

(87) PCT Pub. No.: WO2020/260979
PCT Pub. Date: Dec. 30, 2020

(65) Prior Publication Data
US 2022/0073196 A1    Mar. 10, 2022

(30) Foreign Application Priority Data

Jun. 25, 2019  (EP) .................................... 19182436

(51) Int. Cl.
*B64C 27/59*    (2006.01)
*B64C 27/82*    (2006.01)
(52) U.S. Cl.
CPC .............. *B64C 27/59* (2013.01); *B64C 27/82* (2013.01); *B64C 2027/8218* (2013.01); *B64C 2027/8281* (2013.01)

(58) Field of Classification Search
CPC ................... B64C 27/59; B64C 27/82; B64C 2027/8218; B64C 2027/8281
See application file for complete search history.

(56) References Cited

U.S. PATENT DOCUMENTS 2,338,935 A * 1/1944 Hafner .................... B64C 27/82
  244/101
4,466,773 A   8/1984 Pariani
  (Continued)

FOREIGN PATENT DOCUMENTS

CN    101734374 A   6/2010
CN    107000836 A   8/2017
  (Continued)

*Primary Examiner* — Nicholas McFall
*Assistant Examiner* — Marisa V Conlon
(74) *Attorney, Agent, or Firm* — Leason Ellis LLP

(57) ABSTRACT

An anti-torque rotor is described comprising: a mast rotatable about a first axis; a plurality of blades hinged on the mast and rotatable about respective second axes to vary the respective angles of attack; a control element sliding along the first axis with respect to the mast, rotatable with the mast and connected to the blades to cause the rotation about the second axes; a control mechanism, axially sliding and angularly fixed with respect to the mast; and a connection element interposed between the control mechanism and the control element, sliding integrally with the control mechanism along the mast; the control mechanism comprises a first and a second rod; the rotor comprises a coupling, which is configured to enable/prevent rotation of the second rod with respect to the first rod when the torque exerted by the first connection element on the second rod about the first axis is greater/less than a threshold value in the event of failure of the connection element.

15 Claims, 5 Drawing Sheets

(56) References Cited

U.S. PATENT DOCUMENTS

| | | | |
|---|---|---|---|
| 4,644,811 A * | 2/1987 | Tervo | F16H 25/2015 |
| | | | 74/412 TA |
| 5,415,525 A | 5/1995 | Desjardins et al. | |
| 6,928,895 B2 * | 8/2005 | Davies | F16H 25/2472 |
| | | | 74/22 A |
| 9,359,073 B2 | 6/2016 | Hewitt | |
| 11,708,868 B2 * | 7/2023 | Olson | B64C 27/14 |
| | | | 192/85.01 |
| 11,718,394 B2 * | 8/2023 | McNulty | B64C 27/82 |
| | | | 244/17.19 |
| 2010/0215496 A1 | 8/2010 | Nannoni et al. | |
| 2015/0034760 A1 | 2/2015 | Hewitt | |
| 2019/0276144 A1 * | 9/2019 | Mullen | B64C 27/59 |

FOREIGN PATENT DOCUMENTS

| | | |
|---|---|---|
| EP | 0600797 A1 | 6/1994 |
| EP | 2 982 604 | 2/2016 |
| EP | 3456957 A1 | 3/2019 |
| FR | 3 014 837 | 6/2015 |

* cited by examiner

ANTI-TORQUE ROTOR FOR A HELICOPTER

CROSS-REFERENCE TO RELATED APPLICATIONS

This patent application is a U.S. National Phase Application under 35 U.S.C. § 371 of International Patent Application No. PCT/IB2020/054976, filed on May 26, 2020, which claims priority from European patent application no. 19182436.6 filed on Jun. 25, 2019, all of which are incorporated by reference, as if expressly set forth in their respective entireties herein.

TECHNICAL FIELD

The present invention relates to an anti-torque rotor for a helicopter.

BACKGROUND ART

Helicopters are known to basically comprise a fuselage, a main rotor positioned on the top of the fuselage and rotatable about an axis thereof, and an anti-torque rotor arranged at the tail end of the fuselage.

Helicopters also comprise, in a known manner, one or more power units, such as turbines for example, and a transmission unit interposed between the turbine and the main rotor and adapted to transmit motive power from the turbines to the main rotor itself.

In greater detail, the anti-torque rotor, in turn, basically comprises:

- a mast rotatable about a first axis;
- a hub rotatable about the first axis; and
- a plurality of blades hinged on said hub, projecting in a cantilever fashion from the hub and each extending along respective second axes transversal to the first axis.

The mast of the anti-torque rotor is driven in rotation by a set of gears driven by the main transmission unit.

The blades of the anti-torque rotor rotate integrally with the mast about the first axis and can be selectively tilted about the second axis, so as to be able to vary the respective angles of attack and consequently adjust the thrust exerted by the anti-torque rotor.

In order to adjust the angles of attack of the respective blades, anti-torque rotors comprise:

- a rod, operatively connected to a pedal operable by the pilot through a mechanical connection or fly-by-wire link and sliding inside the mast along the first axis, but angularly fixed with respect to the first axis;
- a control element, also known as a "spider", integrally rotatable with the mast about the first axis and equipped with a plurality of arms connected to respective blades in an eccentric position with respect to the associated second axes; and
- a rolling bearing, mounted in a sliding manner with respect to the first axis, interposed between the rod and control element, and configured so as to transmit an axial load from the rod to the rotatable element.

More specifically, the rolling bearing, in turn, comprises:
a radially outer ring fastened on the control element;
a radially inner ring fastened to the control rod; and
a plurality of rolling bodies, which roll in respective tracks defined by the radially inner and outer rings.

In a normal operating condition of the bearing, the rolling bodies allow rotation of the outer ring with respect to the inner ring and the consequent rotation of the control element with respect to the rod.

Operation of the pedal causes the control rod to slide parallel to the first axis. This sliding causes, via the rolling bearing, the control element to slide parallel to the first axis along a given path of travel.

This sliding causes rotation of the blades about the associated second axes, so as to vary the respective angles of attack by equal amounts associated with the given path of travel.

From the foregoing, it follows that a possible failure of the rolling bearing would risk making the anti-torque rotor substantially uncontrollable, causing a hazardous situation for the helicopter.

In particular, a first failure situation might occur in the case where rolling bodies and/or the tracks of the inner or outer ring become damaged, for example due to the accidental introduction of foreign bodies inside the bearing, the loss of lubricating grease, damage to the tracks or surfaces of the rolling bodies.

In this condition, instead of allowing the relative rotation of the control element to the control rod, the rolling bearing would progressively "seize" and improperly transfer a twisting moment, progressively growing over time, from the outer ring to the inner ring.

This twisting moment would be transmitted to the control rod, generating a risk of damaging the control rod.

Regarding this first failure situation, there is awareness in the industry of the need to reduce the risk that these twisting moments could irreversibly damage the control rod.

A second failure situation might occur in the case where the rolling bodies break with consequent detachment of the inner ring from the rolling bodies. In this case, the bearing would no longer be slidable parallel to the first axis, and the rod would no longer cause translation of the control element.

There is awareness in the industry of the need to promptly detect the failure state of the rolling bearing, so that the pilot can quickly land before the helicopter becomes completely uncontrollable.

There is also awareness in the industry of the need to ensure correct controllability of the anti-torque rotor, even in the event of failure of the rolling bearing.

U.S. Pat. No. 9,359,073 describes an anti-torque rotor for a helicopter according to the preamble of claim 1.

In greater detail, U.S. Pat. No. 9,359,073 describes an anti-torque rotor comprising a mast, a rod, and a first and a second bearing arranged in series.

The first bearing comprises a first rotatable with the mast and a second ring.

The second bearing comprises a third ring and a fourth ring.

The third ring of the second bearing and the first ring of the first bearing are connected to each other in a non-rotatable manner.

The anti-torque rotor also comprises a locking device interposed between the third and the fourth rings and adapted to prevent rotation of the third ring with respect to fourth ring. This locking device comprises an element that is breakable in the case of the first bearing failure and not breakable in the case of correct operation of the first bearing.

The solution shown in U.S. Pat. No. 9,359,073 is particularly complex as it requires using a locking device and connecting the third ring of the second bearing and the first ring of the first bearing together.

DISCLOSURE OF INVENTION

The object of the present invention is to provide an anti-torque rotor that enables satisfying at least one of the aforementioned needs in a simple and inexpensive manner.

The aforesaid object is achieved by the present invention, in so far as it relates to an anti-torque rotor as defined in claim 1.

BRIEF DESCRIPTION OF THE DRAWINGS

For a better understanding of the present invention, a preferred embodiment is described hereinafter, purely by way of non-limitative example and with reference to the accompanying drawings, in which.

BEST MODE FOR CARRYING OUT THE INVENTION

Figure 1:
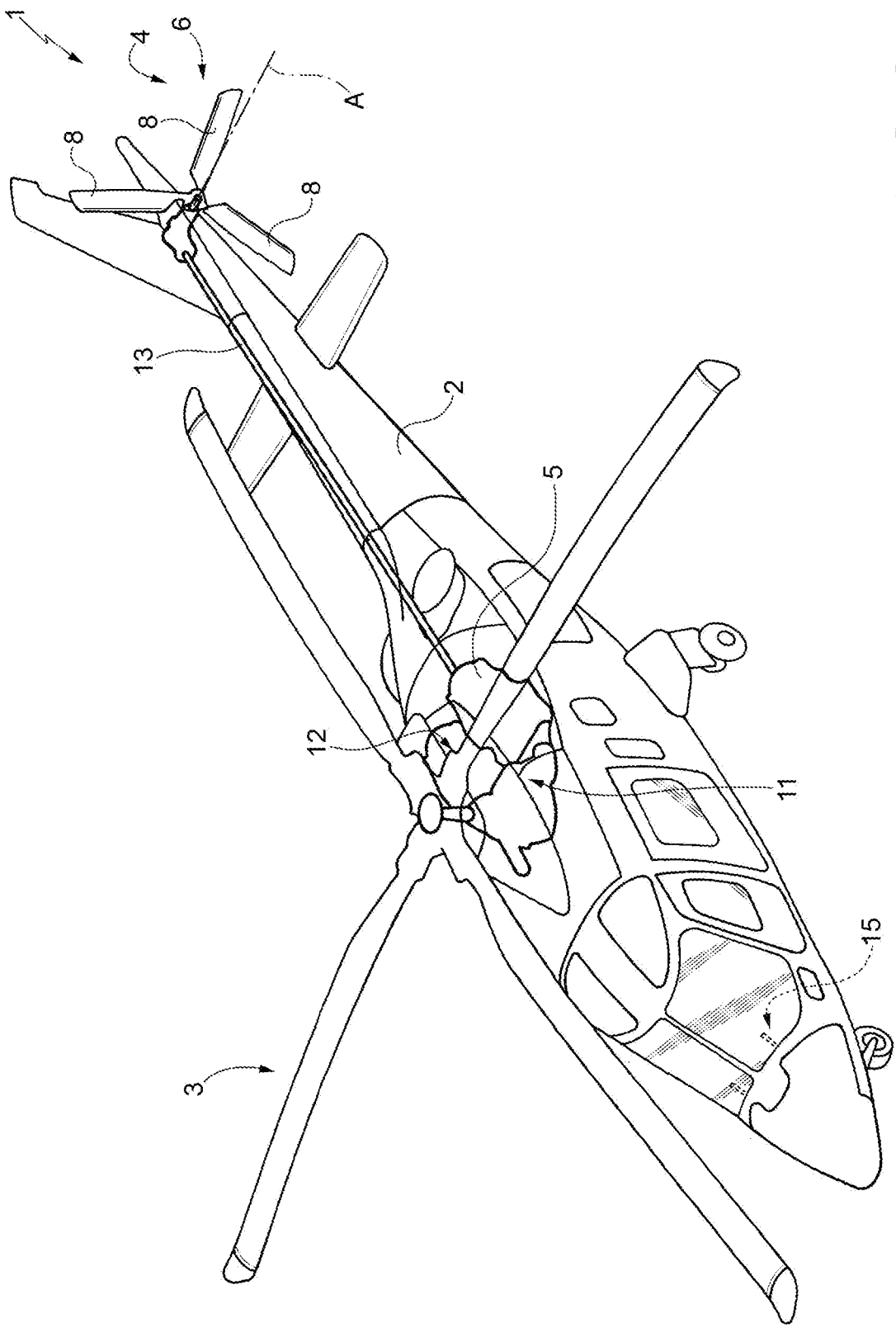
FIG. 1 is a perspective view of a helicopter comprising an anti-torque rotor according to the present invention.
Figure 2:
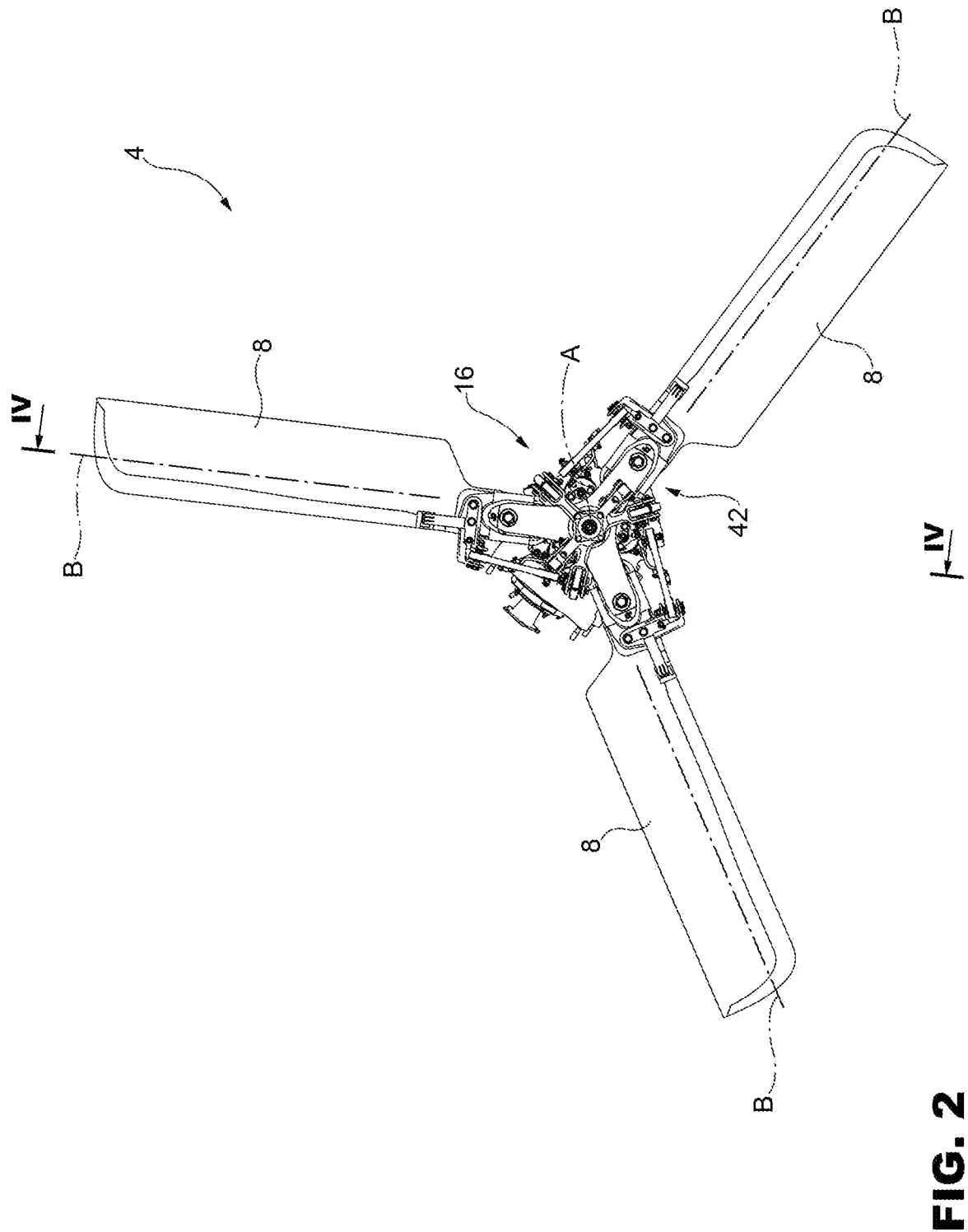
FIGS. 2 and 3 are a top view and a perspective view respectively of the anti-torque rotor of FIG. 1.
Figure 3:
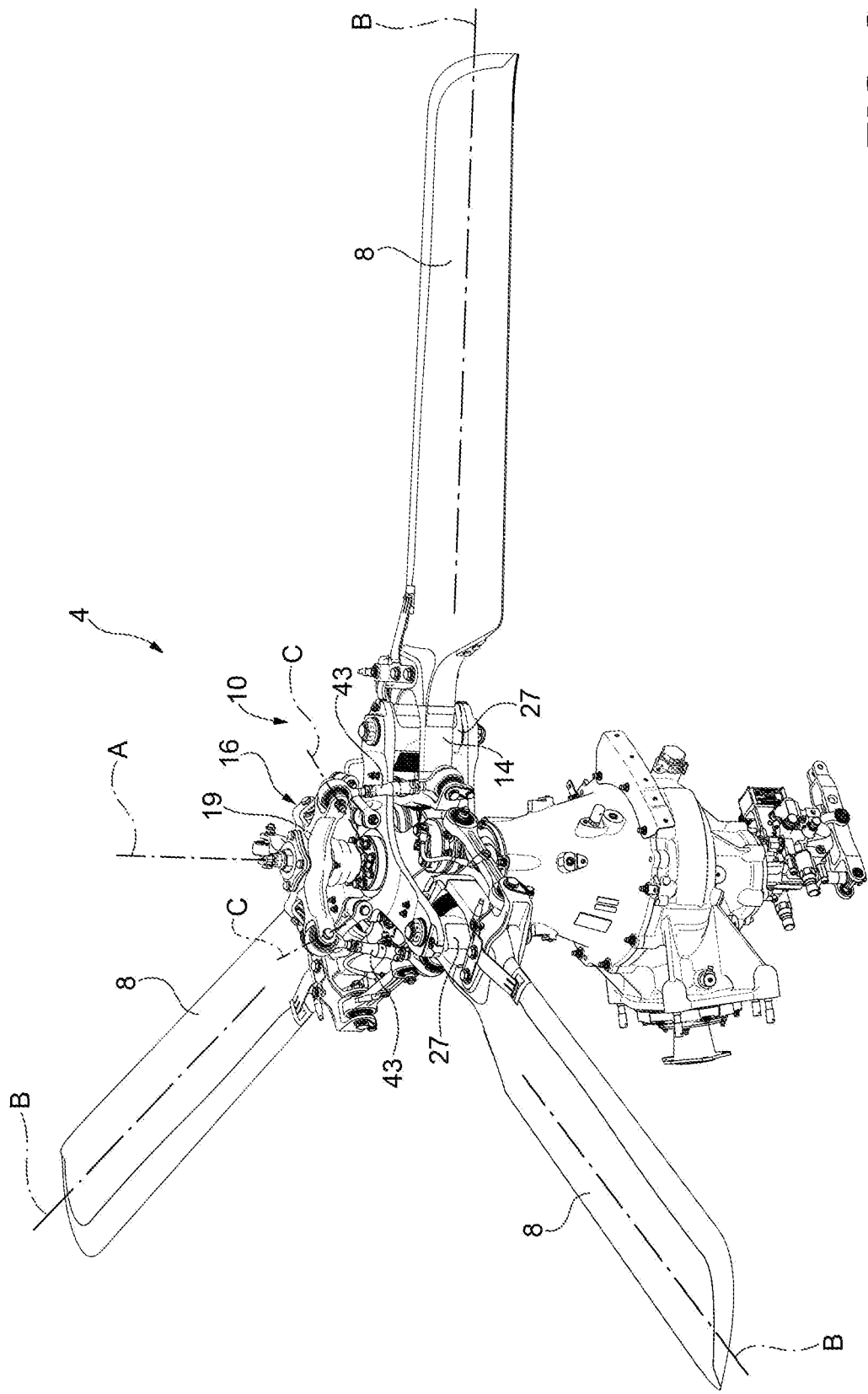
Figure 4:
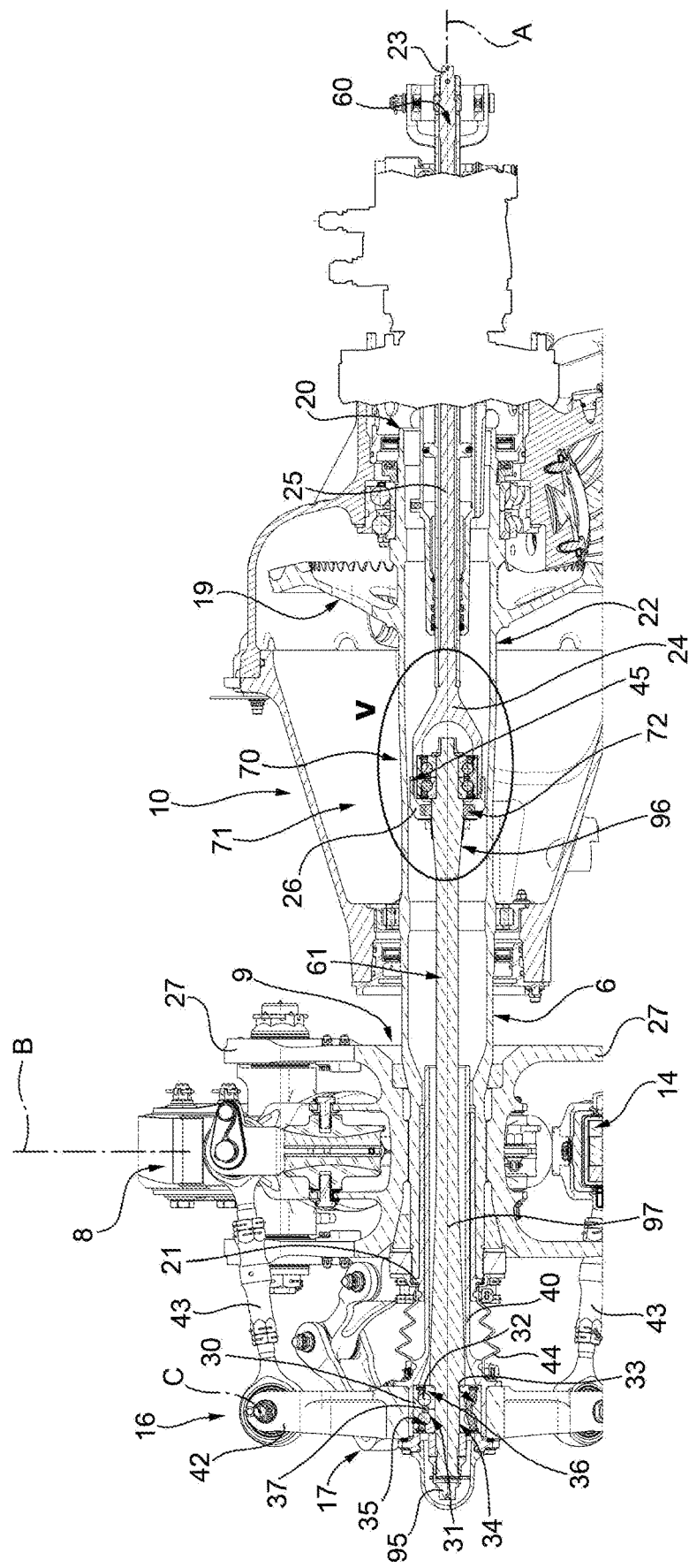
FIG. 4 is a section along the line IV-IV of FIG. 2.
Figure 5:
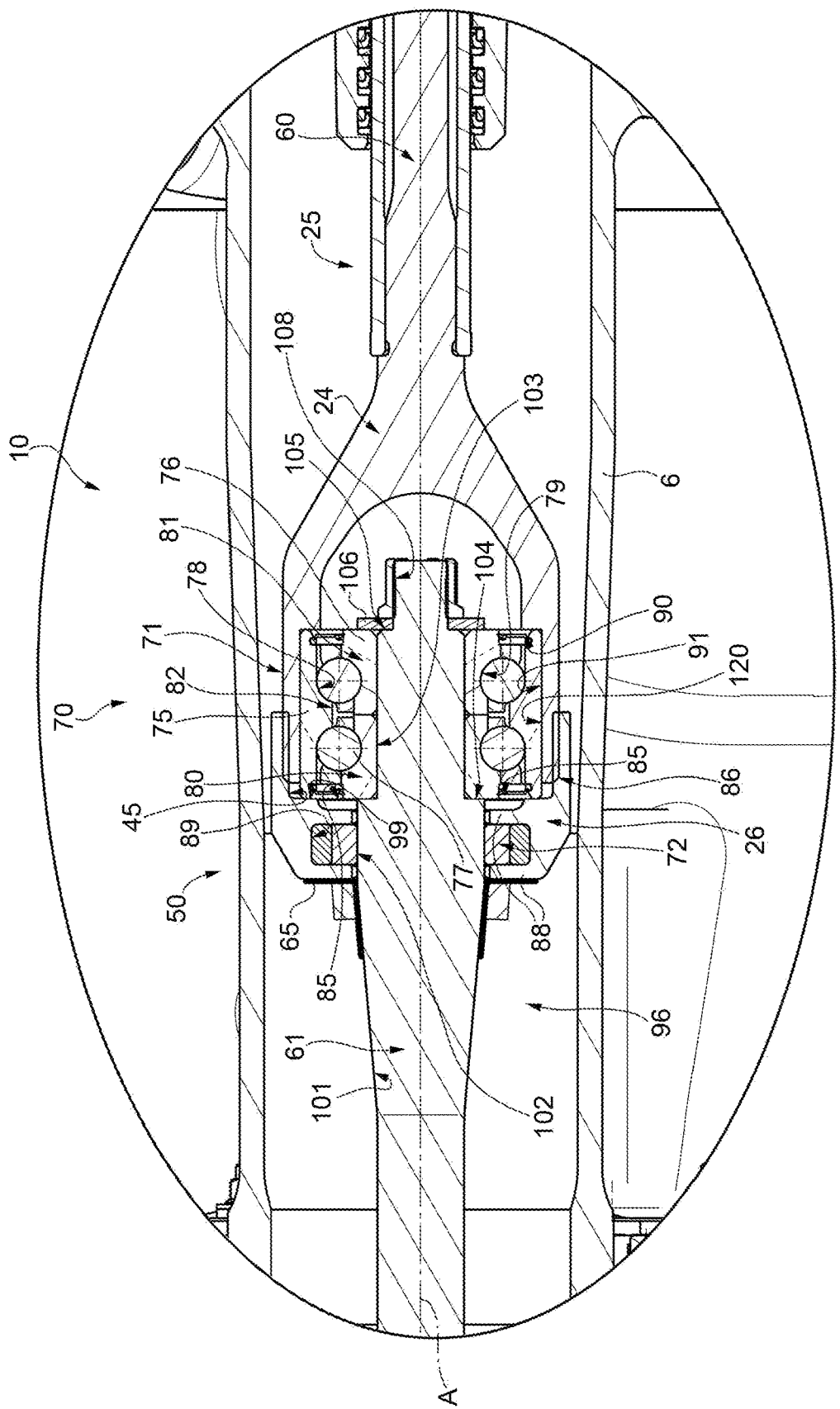
FIG. 5 is an enlarged view of certain details of FIG. 4.

Referring to FIG. 1, reference numeral 1 indicates, in particular, a helicopter basically comprising:
- a fuselage 2;
- one or more turbines 5;
- a main rotor 3 positioned on the top of the fuselage 2 and rotatable about an axis A; and
- an anti-torque rotor 4 located at a tail end of the fuselage 2 and rotatable about an axis thereof, transversal to axis A.

The helicopter 1 also comprises a transmission unit 11, which transmits motive power from the turbines 5 to the main rotor 3.

In turn, the transmission unit 11 comprises:
- a gear train 12, which transmits motive power from the turbine to the main rotor 3; and
- a shaft 13, which transmits motive power from the gear train 12 to the anti-torque rotor 4.

In a known manner, the main rotor 3 is adapted to provide an orientable thrust that enables lift-off and forward flight of the helicopter 1.

The anti-torque rotor 4 generates a thrust, which causes a counter torque on the fuselage 2.

This counter torque is directed in the opposite direction to the torque exerted by the main rotor 3.

According to the amount of thrust generated by the anti-torque rotor 4, it is therefore possible to orientate the helicopter 1 according to a desired yaw angle, or vary said yaw angle depending on the manoeuvre that it is wished to perform.

Referring to FIGS. 2 to 5, the anti-torque rotor 4 basically comprises:
- a mast 6 rotatable about an axis A and operatively connected to the shaft 13 in a known manner;
- a plurality of blades 8, three in number in the case shown, which extend in a cantilever fashion along respective axes B transversal to the axis A; and
- a hub 9 externally fastened to a portion of the mast 6, integrally rotatable with the mast 6 about axis A and on which the blades 8 are hinged.

More specifically, the blades 8 are hinged on the hub 9 so as to be:
- integrally rotatable with the hub 9 and the mast 6 about axis A; and
- tiltable about their respective axes B by the same angles and simultaneously over time, so as to vary the respective angles of attack.

In particular, the hub 9 comprises a plurality of connection elements 27 projecting radially with respect to axis A for connection to the respective blades 8. Each blade 8 also comprises a root portion 14 arranged radially inward with respect to the axis A and hinged on the associated connection element 27 of the hub 9.

In order to vary the aforementioned angles of attack, the anti-torque rotor 4 also comprises:
- a flight control 15 (only schematically shown in FIG. 1) operable by the pilot, for example a pedal;
- a control mechanism 10 sliding parallel to the axis A and operable by the flight control 15, by means of a mechanical connection or a fly-by-wire method;
- an element 16 rotatable integrally with the mast 6 about the axis A and connected to the blades 8 in an eccentric manner with respect to the associated axes B; and
- a bearing 17 slidable parallel to axis A, jointly with the control mechanism 10, and interposed radially between the control mechanism 10 and element 16 and sliding.

More specifically, the mast 6 is hollow.

The mast 6 also comprises (FIGS. 4 and 5):
- an axial end 20;
- an axial end 21, open and opposite to end 20; and
- a main portion 22 interposed between the axial ends 20 and 21 and on which the hub 9 is fitted.

The main portion 22 also defines a flange 19 adapted to receive motive power from the shaft 13.

More specifically, the mast 6 has a maximum diameter at the flange 19, and a progressively decreasing diameter proceeding from the flange 19 towards the ends 20 and 21.

The control mechanism 10 is partly housed inside the mast 6.

The element 16, in turn, comprises (FIG. 4):
- a tubular body 40, partly housed in the mast 6 and connected to the mast 6 in a sliding manner with respect to axis A;
- a flange 42 extending orthogonally to axis A and fastened to the tubular body 40 on the end opposite to the mast 6; and
- a plurality of levers 43 hinged on the flange 42 about respective axes C transversal to axis A and hinged on respective blades 8 in eccentric positions with respect to the associated axes B.

The flange 42 and the bearing 17 are housed outside the mast 6.

More specifically, the flange 42 and the bearing 17 are arranged on the end opposite to end 20 with respect to end 21.

The flange 42 is connected to the mast 6 by a single bellows coupling 44, which slide along the axis A and protect a portion of the tubular body 40.

The levers 43 are generally inclined with respect to axis A and extend from the flange 42 towards the end 20.

The translation of the control mechanism 10 along axis A causes, via the bearing 17, the translation of element 16.

Following the sliding of element 16 along axis A, the levers 43 change their inclination with respect to axis A by the same mutually identical angles, causing the simultaneous rotation of the blades 8 about their respective axes B by the same mutually equal angles.

In particular, the levers 43 are hinged on the root portions 14 of the respective blades 8.

The bearing 17 is able to transmit axial loads parallel to axis A in both directions.

In other words, the bearing 17 is configured so that the translation of the mechanism 10 along axis A in both directions causes the translation of element 16 in the same directions.

The bearing 17 thus defines a transmission unit, which connects the control mechanism 10 and element 16 in an axially integral and angularly movable manner with respect to axis A.

The bearing 17, in turn, comprises:
an outer ring 30 integrally rotatable with element 16;
an inner ring 31 integrally sliding with the mechanism 10; and
a plurality of rolling bodies 32, a double ring of balls in the case shown, rolling on respective tracks 33 and 34 defined by the respective rings 30 and 31.

In the case shown, ring 31 has a pair of shoulders 35 and 36 at mutually opposite sides, projecting radially towards ring 30 and defining respective axial abutment surfaces for the rolling bodies 32. The rolling bodies 32 are, in particular, axially interposed between the shoulders 35 and 36.

Furthermore, ring 31 is made in two half-rings, arranged axially in contact with each other in the case shown.

Ring 30 comprises a shoulder 37 axially interposed between shoulders 35 and 36, projecting radially towards ring 31 and defining respective abutment surfaces for the rolling bodies 32. Shoulder 37 is axially interposed between the rolling bodies 32 on a plane of symmetry of the bearing 17 radial to axis A.

Furthermore, outer ring 30 is fastened on the tubular body 40 of element 16 on the opposite side to flange 42 in a direction radial to axis A.

The control mechanism 10, in turn, advantageously comprises:
a rod 60 operated by the flight control 15; and
a rod 61 connected to the bearing 17;
The anti-torque rotor 4 also comprises a coupling 70, which enables the rods 60 and 61 to slide along axis A integral with each other.
The coupling 70 is also configured to:
enable the rotation of rod 61 with respect to rod 60, when the torque exerted by the bearing 17 on rod 61 about axis A is greater than a threshold value in conditions of failure of the bearing 17; and
prevent the rotation of rod 61 with respect to rod 60, when the torque exerted by the bearing 17 on rod 61 is less than the threshold value.

In greater detail, rod 61 is fixed to ring 31 of the bearing 17.

It is important to underline that in normal operating conditions, the bearing 17 enables free rotation of ring 30 with respect to ring 31 about axis A, i.e. of element 16 with respect to rod 61. In other words, the bearing 17 does not transmit any twisting moment to rod 61.

One cause of failure of the bearing 17 is caused by the progressive "seizing" of the bearing 17. In this condition, ring 31 of the bearing is progressively dragged in rotation about axis A by the rolling bodies 32.

Consequently, because of the failure condition, the bearing 17 improperly transfers a twisting moment to rod 61.

In greater detail, the coupling 70 comprises (FIGS. 4 and 5):
a ring 72 made of a high-friction material; and
a rolling bearing 71 interposed between rods 60 and 61.

The ring 72 is radially interposed between rods 60 and 61.

The friction coefficient of the material of the ring 72 is such as to counter the torque exerted by bearing 17 on rod 61, if this torque is less than the threshold value and substantially not yet hazardous for the correct operation of the rods 60 and 61.

In this condition, the coupling 70 keeps both rods 60 and 61 angularly fixed about axis A. Consequently, both rods 60 and 61 are subjected to the twisting moment transmitted by bearing 17.

If the torque transmitted by bearing 17 to rod 61 is greater than the threshold value and, therefore, substantially hazardous for correct operation of the rods 60 and 61, it can no longer be countered by ring 72. Consequently, the coupling 70 makes rod 61 rotatable with respect to rod 60 about axis A integrally with the failing bearing 17. In this condition, rod 61 is rotationally free. The rods 60 and 61 are therefore not subjected to a torque exceeding the threshold value and improperly transmitted by the failing bearing 17.

Moreover, bearing 17, and therefore also element 16 remain integrally connected to the rods 60 and 61 with respect to translation along axis A, thereby preserving the possibility of adjusting the angle of attack of the blades 8, even in conditions of failure of bearing 17.

In the case shown, ring 72 is made of an elastomeric material.

Bearing 71, similarly to bearing 17, is able to transmit axial loads parallel to axis A in both directions.

In other words, bearing s configured such that the translation of rod 60 in both directions, via operation of the flight control 15, causes the corresponding translation of rod 61 in the same direction.

Bearing 71 thus connects the rods 60 and 61 in an angularly movable manner with respect to axis A and an axially fixed manner with respect to axis A.

Bearing 71, in turn, comprises:
a radially outer ring 75 connected to rod 60;
a radially inner ring 76 connected to rod 61; and
a plurality of rolling bodies 77, in the case shown, a double ring of balls rolling on respective tracks 78 and 79 defined by the respective rings 75 and 76.

In the case shown, ring 76 has a pair of shoulders 80 and 81 at mutually opposite axial sides, projecting radially towards ring 76 and defining respective axial abutment surfaces for the rolling bodies 77. The rolling bodies 77 are, in particular, axially interposed between the shoulders 80 and 81.

Furthermore, ring 76 is made in two half-rings, arranged in contact axially against each other in the case shown.

Ring 75 of bearing 71 comprises a shoulder 82 axially interposed between shoulders 80 and 81, projecting radially towards ring 76 and defining respective abutment surfaces for the rolling bodies 77. Shoulder 82 is axially interposed between the rolling bodies 77 on a plane of symmetry of bearing 71 radial to axis A.

Rod 60, in turn, comprises:
a main portion 25 operable by the flight control 15; and
an annular end ring 26 arranged on the side of the bearing 17.

The main portion 25, in turn, comprises:
an axial end 23 opposite to bearing 17 and adapted to receive an axial displacement, following operation of the flight control 15, and delimiting the main portion 23 (FIG. 4); and
a protuberance 24 of the axial end opposite to end 23 and defining a cavity 45 for receiving bearing 71.

The protuberance 24, in turn, comprises:
a surface 91 of axial development; and
a shoulder 90 of radial extension, with a smaller diameter than surface 91.

Ring 26, in turn, comprises:
a head portion 85 of radial development, arranged on the side of bearing 17 and through which rod 61 passes with radial play; and
a portion 86 of axial extension, projecting in a cantilever fashion from portion 85 on the side facing bearing 17 and surrounding the protuberance 24.

In particular, portion 85 comprises a pair of axially separated arms 88 defining an annular seat 89 between each other.

The protuberance 24 and portion 86 of rod 60 are preferably screwed together.

Rod 61, in turn, comprises:
an end 95 arranged externally to mast 6 and axially delimiting rod 61 on the side of bearing 17;
an end 96 opposite to end 95, housed inside the protuberance 24 and ring 26; and
a main portion 97, which extends between ends 95 and 96.

In particular, the main portion 97 is partly housed inside the mast 6.

In particular, end 96 comprises:
a truncated-cone shaped segment 101 tapered towards end 95 and through which the portion 85 passes with play;
a cylindrical segment 102 of larger diameter than the diameter of segment 101;
a cylindrical segment 103 of smaller diameter than the diameter of segment 102; and
a cylindrical segment 108 of smaller diameter than the diameter of segment 103.

The end 96 further comprises:
a radial shoulder 104 interposed between segments 102 and 103; and
a radial shoulder 105 interposed between segments 103 and 108.

The bearing 71 is housed in a seat 120 axially delimited by the protuberance 24 and by the ring 26 of rod 60 and radially delimited by end 96 of rod 61 and by the protuberance 24 of rod 60.

The ring 75 of bearing 71 is axially blocked between shoulder 90 defined by the protuberance 24 and axially opposite to ring 26, and portion 85 of ring 26.

Furthermore, ring 75 is fastened to the surface 91 of the protuberance 24, of axial development and larger diameter than shoulder 90.

In greater detail, ring 76 is axially blocked between shoulder 104 and a locking element 106 fastened on shoulder 105 on the side axially opposite to shoulder 104.

Furthermore, ring 76 is fastened in a position radially inside segment 103 of rod 61.

The main portions 25 and 97 of the respective rods 60 and 61 are at least partly housed inside the mast 6.

In the case shown, segment 102 partly delimits seat 89.
The ring 72 is housed inside seat 89.
The flange 42 and bearing 17 are housed externally to the mast 6 and surround a portion of rod 61.

The anti-torque rotor 4 further comprises a sensor 50 adapted to generate a signal associated with the failure of bearing 17, in particular to the fact that bearing 17 transmits a torque to the rod 61 that is higher than the threshold value.

In particular, the sensor 50 comprises an element 65 interposed between the rods 60 and 61 and breakable following rotation of rod 61 relative to rod 60, when the torque transmitted to rod 61 by bearing 17 exceeds the threshold value.

In the case shown, element 65 is interposed between ring 26 of rod 60 and segment 101 of rod 61.

In use, operation of the main rotor 3 generates a thrust that enables sustaining the helicopter 1 in the air and forward flight of the helicopter 1.

Operation of the main rotor 3 also generates torque on the fuselage 2 that is balanced by the counter-torque generated by the thrust of the anti-torque rotor 4.

In order to control the yaw angle of the helicopter 1, the pilot operates flight control 15, so as to adjust the pitch of the blades 8 of the anti-torque rotor 4, and consequently the thrust generated by the anti-torque rotor 4.

During operation of the anti-torque rotor 4, the mast 6 is driven in rotation about axis A by the shaft 13 and drags the hub 9, element 16 and the blades 8 in rotation about axis A.

Operation of the flight control 15 causes translation of the control mechanism 10, formed by rods 61 and 62, along axis A.

This translation causes integral translation of the bearing 17 and element 16 along axis A.

Consequently, element 16 moves away from (or closer to) the blades 8 and varies the inclination of the levers 43 with respect to axis B, increasing (or decreasing) the angle of attack of the blades 8.

This movement of the levers 43 causes the simultaneous rotation by equal angles of the blades 8 about the associated axes B and the consequent adjustment of the angles of attack of the blades 8.

Operation of the anti-torque rotor 4 is described below, starting from a condition in which bearing 17 functions correctly and does not transmit any torque to rod 61 about axis A.

In this condition, ring 30 rotates about axis A integrally with element 16, while ring 31 and the rods 60 and 61 do not rotate about axis A.

Consequently, the rings 75 and 76 of bearing 71 do not rotate about axis A and bearing 71 remains substantially inactive.

In the event of failure of the bearing 17, the rolling bodies 32 progressively drag ring 31 in rotation and, consequently, exert a twisting moment about axis A on rod 61.

While the value of this twisting moment is below the threshold value, the coupling 70 prevents rotation of rod 61 with respect to rod 60, keeping bearing 71 inactive.

In particular, ring 72 exerts friction torque on rod 61 that is equal and in the opposite direction to the torque exerted by bearing 17 on rod 61.

Therefore, rod 61 is rotationally fixed and subjected to a twisting moment equal to the value of the torque transmitted to rod 61 by bearing 17.

However, this twisting moment is not sufficient to damage the rods 60 and 61.

The control mechanism 10 continues to successfully adjust the angles of attack of the blades 8 even when bearing 17 has partially failed.

The progressive worsening of the fault of bearing 17 causes a progressive increase in the twisting moment transmitted from bearing 17 to rod 61, until the threshold value is exceeded.

In conditions of total seizure, bearing 17 improperly transmits the maximum value of twisting moment to rod 61.

When the value of the twisting moment transmitted to rod 61 by bearing 17 exceeds the threshold value, the coupling 70 enables the rotation of rod 61 with respect to rod 60, which instead remains angularly fixed with respect to axis A.

This happens because ring 72 is unable to exert torque on rod 61 greater than the threshold value, i.e. equal to the exerted torque.

The rotation of rod 61 with respect to rod 60 about axis A is enabled by bearing 71. More specifically, the rotation is enabled by the rotation of ring 76 integral with rod 61 with respect to ring 75 integral with rod 60.

Rod 61 is rotationally free and angularly decoupled from rod 60.

In this condition, operation of the flight control 15 still causes the integral translation of rods 60 and 61, bearing 17 and, consequently, element 16, thus preserving the possibility of adjusting the angles of attack of the blades 8 even in conditions of failure of bearing 17.

The sensor 50 detects the rotation of rod 61 with respect to rod 60 through the breaking of element 65 and consequently informs the crew of the failure of bearing 17 and of the need to quickly land.

From an examination of the characteristics of the anti-torque rotor 4 according to the present invention, the advantages that can be achieved therewith are evident.

In particular, the coupling 70 enables the rods 60 and 61 to slide along axis A integrally with one another and enables rotation of rod 61 with respect to rod 60 when the torque exerted on rod 61 by bearing 17 exceeds the threshold value.

In this way, in the event of failure of bearing 17 that results in a high torque value transmitted to rod 61, the risk of damaging the rods 60 and 61 is significantly reduced.

At the same time, in the event of failure of bearing 17, the mechanism 10 continues to effectively move along axis A, thereby continuing to ensure the desired adjustment of the angles of attack of the blades 8.

The friction ring 72 limits the maximum value of torque transmissible from bearing 17 to rod 61 to the threshold value in a simple and efficient manner.

At the same time, bearing 71 axially constrains the rods 60 and 61, and enables the relative rotation of rod 61 with respect to rod 60, when the torque transmitted from bearing 17 to rod 61 exceeds the threshold value.

Due to this, the anti-torque rotor 4 is particularly simple to manufacture and maintain with respect to the known solutions mentioned in the introductory part of this description.

The sensor 50 detects when the torque transmitted to the rod 61 by bearing 17 has exceeded the threshold value through the breaking of element 65 following the relative rotation of rod 61 with respect to rod 60.

In this way, the sensor 50 promptly informs the crew of the failure of bearing 17 and of the urgent need to land.

Finally, it is clear that modifications and variants can be made to the anti-torque rotor 4 described and illustrated herein without departing from the scope defined by the claims.

The invention claimed is:

1. An anti-torque rotor (4) for a helicopter (1), comprising:
   a mast (6), rotatable about a first axis (A);
   a plurality of blades (8), hinged on said mast (6), extending along respective second axes (B) transversal to said first axis (A) and rotatable about respective said second axes (B) to vary the respective angles of attack;
   a control element (16), sliding along said first axis (A) with respect to said mast (6), integrally rotatable with said mast (6), and operatively connected to said blades (8) to cause the rotation of said blades (8) about respective said second axes (B) following a translation of said element (16) along said first axis (A);
   a control mechanism (10), sliding axially along said first axis (A) with respect to said mast (6) and angularly fixed with respect to said first axis (A); and
   a connection element (17), interposed between said control mechanism (10) and said control element (16), sliding along said first axis (A) with respect to said mast (6) and integrally with said control mechanism (10), and configured to enable the relative rotation of said control element (16) with respect to said control mechanism (10) about said first axis (A) in a correct operating configuration;
   wherein said control mechanism (10) comprises:
   a first rod (60); and
   a second rod (61), connected to said connection element (17);
   said rotor (4) further comprising a coupling (70), which enables said first and second rods (60, 61) to slide along said first axis (A) integrally with one another;
   said coupling (70) being configured so as to enable rotation of said second rod (61) with respect to said first rod (60) when the torque exerted, in use, by said first connection element (17) on said second rod (61) about said first axis (A) is greater than a threshold value in the event of failure of said connection element (17);
   said coupling (70) being configured so as to prevent the rotation of said second rod (61) with respect to said first rod (60) when said torque exerted, in use, by said connection element (17) on said second rod (61) is less than said threshold value.

2. The rotor according to claim 1, wherein said coupling (70) comprises a friction element (72), radially interposed between said first rod (60) and said second rod (61) and configured so as to maintain said first and second rods (60, 61) angularly integral with one another, when said torque is less than said threshold value.

3. The rotor according to claim 2, wherein said friction element (72) is made of an elastically deformable material.

4. The rotor according to claim 1, further including a sensor (50) configured to generate a signal associated with the rotation of said second rod (61) about said first axis (A) with respect to said second rod (60).

5. The rotor according to claim 4, wherein said sensor (50) comprises an element (65), interposed between said first rod (60) and said second rod (61), said element (65) being breakable following the rotation of said second rod (61) with respect to said first rod (60).

6. The rotor according to claim 1, wherein said coupling (70) further comprises a first rolling bearing (71) interposed between said first and second rods (60, 61).

7. The rotor according to claim 6, wherein said first bearing (71) is able to transmit a load directed along said first axis (A) in both directions from said first rod (60) to said second rod (61);
   and said first bearing (71) comprises:
      a first ring (75) fastened to said first rod (60);
      a second ring (76) fastened to said second rod (61); and
      a plurality of rolling bodies (77) rolling, in use, on a first and a second track (78, 79) defined by said first and second rings (75, 76), respectively.

8. The rotor according to claim 7, wherein said first rod (60) comprises:
   a tubular body (24) having an open axial end (45) through which a first segment (103) of said second rod (61) passes; and a ring-shaped cover (26) arranged to close said axial end (45) of said tubular body (24) and through which a second segment (102) of said second rod (61) passes; and wherein said second ring (76) is fastened to said first segment (103) of said second rod (61);

said second rod (61) comprising:

a second shoulder (104) radially projecting from said second segment (102) and axially cooperating with said second ring (76) of said first bearing (71);

said coupling (70) further comprising a locking element (106), fastened on said second rod (61) in a position axially opposite to said second shoulder (104), and axially cooperating with said second ring (76) of said second bearing (71).

9. The rotor according to claim 1, wherein said first rod (60) comprises:

a tubular body (24) having an open axial end (45) through which a first segment (103) of said second rod (61) passes; and a ring-shaped cover (26) arranged to close said axial end (45) of said tubular body (24) and through which a second segment (102) of said second rod (61) passes.

10. The rotor according to claim 9, wherein a friction element (72) is interposed between said a ring-shaped cover (26) and said second segment (102) of said second rod (61).

11. The rotor according to claim 9, wherein a breakable element (65) is interposed between said a ring-shaped cover (26) and said second rod (61).

12. The rotor according to claim 9 wherein said tubular body (24), said ring-shaped cover (26) and said second rod (61) define a second seat (120) for a first bearing (71).

13. The rotor according to claim 9, wherein said tubular body (24) of said first rod (60) defines a first shoulder (90) arranged in abutment against a first ring (75) of a first bearing (71);

said first ring (75) being fixed, in a radial direction to said first axis (A), to said tubular body (24);

said ring-shaped cover (26) having said second rod (61) pass through it and defining an abutment surface (85) of radial development in contact with said first ring (75) on the side axially opposite to said first shoulder (90).

14. The rotor according to claim 1, wherein said connection element (17) is a second rolling bearing (17);

said second bearing (17), in turn, comprising:

a third ring (30) integrally rotatable with said control element (16) about said first axis (A);

a fourth ring (31) radially within said third ring (30) with respect to said first axis (A) and integral with said second rod (61) of the control mechanism (10) along said first axis (A); and a plurality of further rolling bodies (32), which are interposed between said third and fourth rings (30, 31) and adapted to roll on respective further tracks (33, 34) of said third and fourth rings (30, 31);

said first and second rolling bearings (17, 71) being arranged at respective axial ends (95, 96) of said second rod (61).

15. A helicopter comprising:

a fuselage (2);

a main rotor (3); and an anti-torque rotor (4) according to claim 1.

* * * * *